United States Patent
Sawa et al.

(10) Patent No.: US 8,540,220 B2
(45) Date of Patent: Sep. 24, 2013

(54) AIR SPRING FOR VEHICLE AND RAILWAY TRUCK FOR VEHICLE

(75) Inventors: Takayuki Sawa, Osaka (JP); Hideki Kitada, Osaka (JP); Toshihisa Adachi, Osaka (JP); Hirokazu Haraguchi, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/133,079

(22) PCT Filed: Jun. 30, 2010

(86) PCT No.: PCT/JP2010/061105
§ 371 (c)(1),
(2), (4) Date: Jun. 6, 2011

(87) PCT Pub. No.: WO2011/004742
PCT Pub. Date: Jan. 13, 2011

(65) Prior Publication Data
US 2011/0233832 A1 Sep. 29, 2011

(30) Foreign Application Priority Data
Jul. 7, 2009 (JP) ................................. 2009-160770
Sep. 16, 2009 (JP) ................................. 2009-214025

(51) Int. Cl.
*F16F 9/05* (2006.01)
(52) U.S. Cl.
USPC ............................... 267/3; 267/35; 267/64.27
(58) Field of Classification Search
USPC ........................ 267/3, 35, 64.27; 105/198.1
See application file for complete search history.

(56) References Cited

U.S. PATENT DOCUMENTS

| | | | |
|---|---|---|---|
| 3,074,709 A | | 1/1963 | Ballard et al. |
| 3,112,922 A | * | 12/1963 | Musschoot .................... 267/117 |
| 3,774,550 A | | 11/1973 | Lich |
| 3,826,507 A | * | 7/1974 | Brand et al. ....................... 267/3 |

(Continued)

FOREIGN PATENT DOCUMENTS

| | | |
|---|---|---|
| CN | 1335812 A | 7/2000 |
| CN | 1345673 A | 4/2002 |

(Continued)

OTHER PUBLICATIONS

Notification of First Office Action issued on Aug. 31, 2012 in CN 201080002721.6.

*Primary Examiner* — Bradley King
(74) *Attorney, Agent, or Firm* — Drinker Biddle & Reath LLP

(57) ABSTRACT

The invention offers an air spring for obtaining a vehicle that renders good comfortableness even at the time of the curved-track running. The air spring for a vehicle has an upper board, a lower board, a diaphragm, and a stopper rubber placed between the lower board and a lower plate. The air spring is provided with a mechanism for restraining the displacement of the stopper rubber, the mechanism having a first restraining member placed on either one of the lower plate and the lower board and a second restraining member placed on the other. The shape of restraining wall surfaces is formed such that in the relative positional relationship between the first and second restraining members, when the first or second restraining member displaces itself such that it delineates an arc by placing the center at the railway truck axis of the railway truck of a vehicle, the spacings between the first and second restraining members at the left side and right side are equal to each other or decrease as the amount of displacement along the arc increases.

16 Claims, 10 Drawing Sheets

(56) References Cited

U.S. PATENT DOCUMENTS

| | | | |
|---|---|---|---|
| 3,904,181 A * | 9/1975 | Harsy-Vadas | 267/35 |
| 4,196,671 A * | 4/1980 | Herring, Jr. et al. | 105/199.3 |
| 4,368,672 A * | 1/1983 | Germer | 105/199.3 |
| 6,257,561 B1 * | 7/2001 | Nakayama et al. | 267/64.19 |
| 2006/0170140 A1 * | 8/2006 | Menk et al. | 267/35 |
| 2006/0180048 A1 * | 8/2006 | Teichman et al. | 105/198.1 |

FOREIGN PATENT DOCUMENTS

| | | |
|---|---|---|
| JP | 3400551 | 1/1996 |
| JP | 10-288236 | 10/1998 |
| JP | 2001-163219 | 6/2001 |
| JP | 2005-36825 | 2/2005 |
| JP | 2007-127264 | 5/2007 |

\* cited by examiner

FIG. 1
BACKGROUND ART
(a)
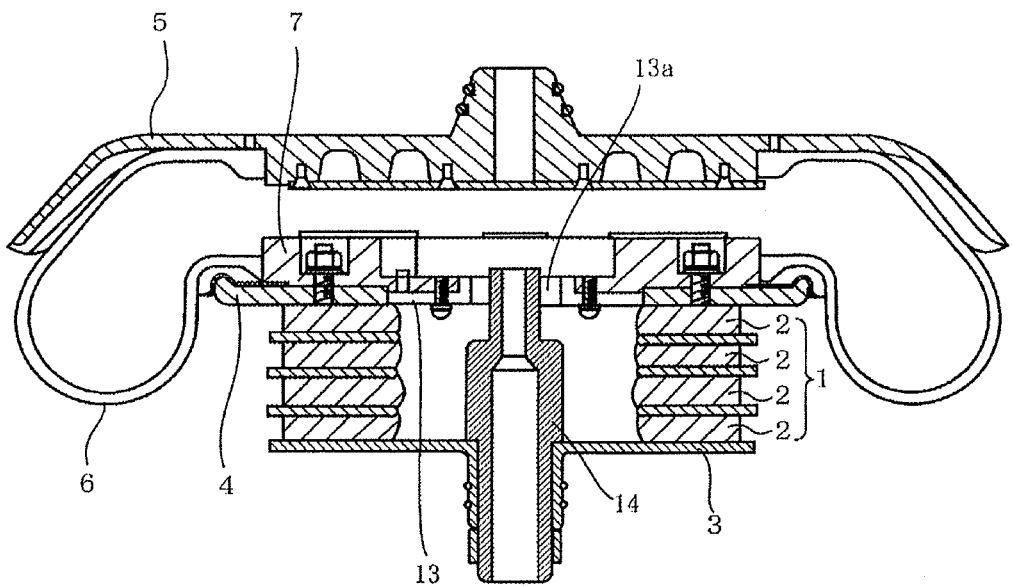
(b)
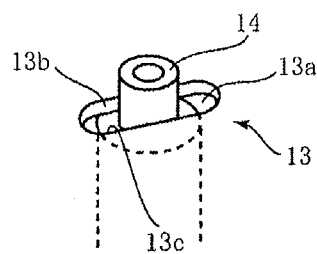

FIG. 2
BACKGROUND ART
(a)
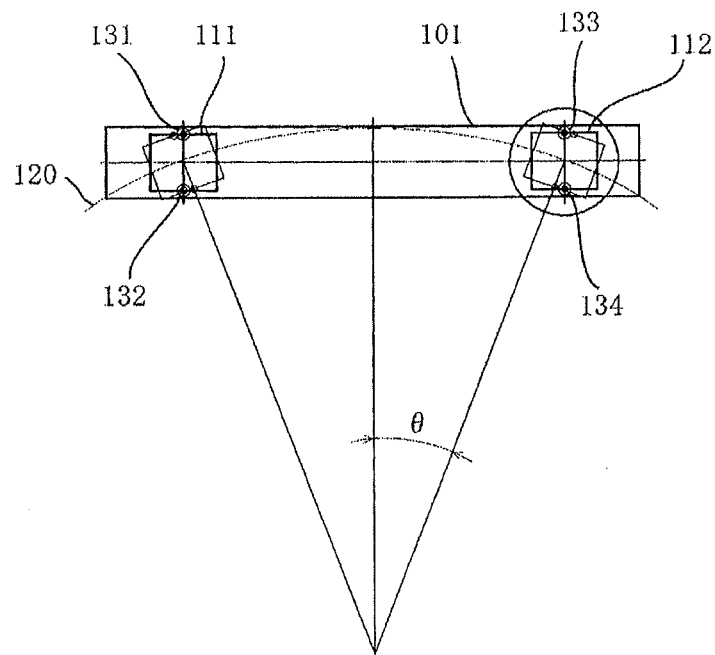
Center of the curve
(b)
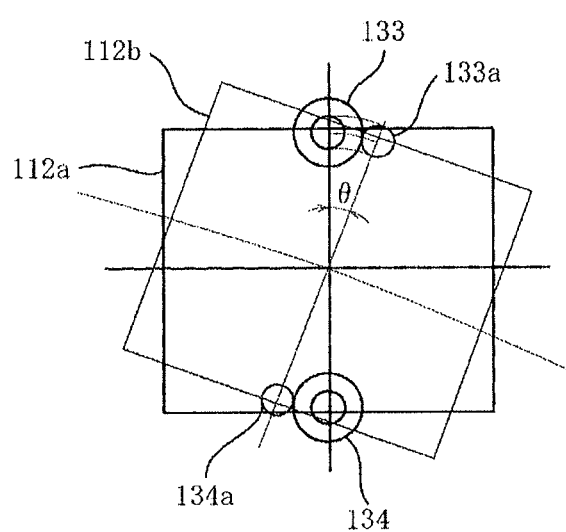

FIG. 10
(a)
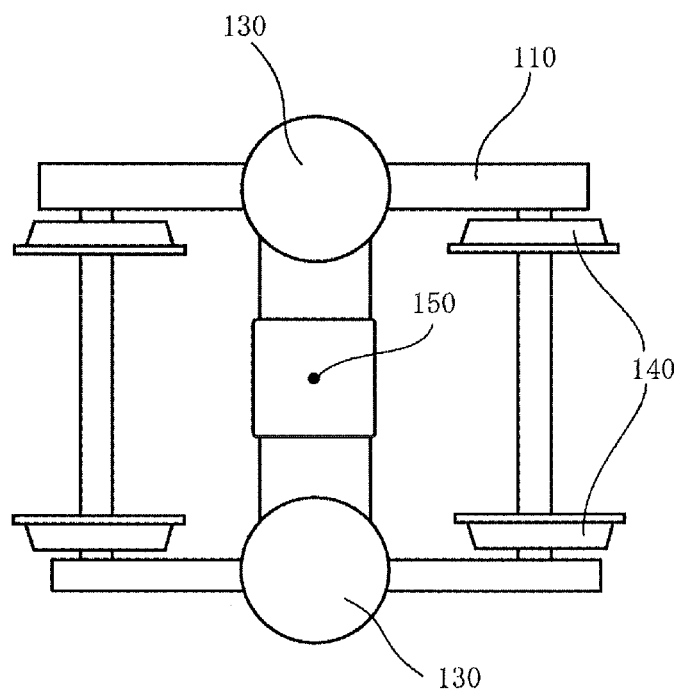
(b)
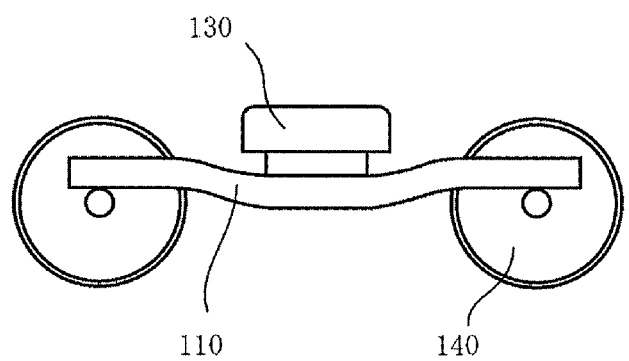

US 8,540,220 B2

AIR SPRING FOR VEHICLE AND RAILWAY TRUCK FOR VEHICLE

TECHNICAL FIELD

The present invention relates to an air spring for a vehicle, particularly an air spring to be used between a railway truck and the vehicle body of a railway vehicle, and to a railway truck for a vehicle, the truck being provided with the air spring.

BACKGROUND ART

An air spring is used as a secondary spring, which is one of the spring devices provided on a railway truck of a railway vehicle and is placed between the railway truck and the vehicle body. For example, a bolsterless railway truck frequently incorporates an air spring having a structure in which a diaphragm and a stopper rubber are combined. The air spring attenuates vertical vibrations of the vehicle body. Although, the air spring having the foregoing structure has a nonlinear spring constant in the vertical direction and consequently exhibits excellent vibration-absorbing ability, it has a nearly linear spring constant in the horizontal direction and consequently exhibits poor ability to prevent the horizontal relative movement between the railway truck and the vehicle body. As a result, when a high-speed running of a vehicle is intended without changing the existing railway track, at the time of the curved-track running, a lack of cant causes a centrifugal force exceeding a predetermined limit, thereby increasing the amount of the horizontal (leftward and rightward) relative movement between the railway truck and the underframe of the vehicle. It has been recognized that this increase creates significant rolling of the vehicle and collisions of the underframe with the leftward-and-rightward-movement stopper, thereby impairing the comfortableness in the running vehicle.

To solve this problem, in particular, for such a use as in a railway vehicle intended to perform high-speed running, an air spring is used that has a nonlinear property achieved by limiting the leftward-and-rightward movement of the stopper rubber with respect to the vehicle. At the time of the straight-track running, the foregoing air spring functions as a relatively flexible spring having a spring constant obtained by combining the properties of the diaphragm and the stopper rubber. At the time of the curved-track running or the like, when a leftward-and-rightward displacement exceeding a predetermined amount is created, the deformation of the stopper rubber is restricted and only the diaphragm functions as the spring, thereby giving the air spring a large spring constant. Such an air spring has been disclosed, for example, in Patent Literature 1.

CITATION LIST

Patent Literature

Patent Literature 1: the published Japanese patent 3400551

SUMMARY OF INVENTION

Technical Problem

FIG. 1 is a diagram showing the air spring of Patent Literature 1. The name of the individual portions in the diagram is changed according to that of the present Description. A diaphragm 6 is formed such that it is sandwiched between an upper board 5 and a lower board 7. The diaphragm's interior is pressurized with air, so that the diaphragm functions as a spring. A stopper rubber 1, which is a laminated rubber, is provided between the lower board 7 and a lower plate 3 to function as another spring. The laminated rubber has a structure in which multiple rubber layers 2 are laminated through a plate at a position between an upper plate 4 and the lower plate 3. A protruding member 14 fixed to the lower plate 3 and a cross-sectionally long hole 13a formed in a stopper flange 13, which is fixed to the lower board, are structured such that the protruding member 14 is inserted into the cross-sectionally long hole 13a as shown in FIG. 1(b). Consequently, the displacement of the stopper rubber 1 is restricted by the contact with a side-wall portion of the cross-sectionally long hole in one direction and by the contact with an end portion of the cross-sectionally long hole in the other direction.

The above-described structure can create a desirable nonlinear effect at the time of the large leftward-and-rightward displacement of the air spring without increasing the leftward-and-rightward spring constant of the entire air spring at the time of the small leftward-and-rightward displacement of the air spring, that is, without impairing the comfortableness at the time of the straight-track running. As a result, the structure facilitates the response to the high-speed running of the vehicle on the existing railway track. Nevertheless, while the requirement is being made to further increase the speed of the railway, in consideration of the high-speed running on the existing railway track, it is desired to further improve the comfortableness in the running vehicle.

Solution to Problem

To solve the above-described problem, the present inventors have intensely studied and found the shortcomings of the conventional stopper structure as described below. Thus, the present invention has been made. The present invention is specifically described below.

The present invention offers an air spring for a vehicle, the air spring being to be used in a vehicle having a railway truck and a vehicle body, being to be mounted between the railway truck and the vehicle body, and having:

a diaphragm placed between an upper board to be connected to the vehicle body and a lower board, and a stopper rubber placed between a lower plate to be connected to the railway truck and the lower board.

The air spring further has a displacement-restraining mechanism that has:

a first restraining member placed on either one of the lower plate and the lower board, and a second restraining member placed on the other.

In a state where the vehicle provided with the air spring is running along a straight track, when the traveling direction of the vehicle is defined as the back-and-forth direction and the direction perpendicular to the back-and-forth direction in a horizontal plane is defined as the left-right direction:

the first restraining member has left and right outer surfaces positioned in the left and right directions, respectively, away from the center of a horizontal cross section of the first restraining member, the second restraining member has restraining wall surfaces located at the left side and right side of the first restraining member and facing the left and right outer surfaces of the first restraining member, respectively, and the shape of the restraining wall surfaces is formed such that in the relative positional relationship between the first restraining member and the second restraining member, when the first or second restraining member displaces itself such that it delineates an arc by placing the center at the railway truck axis of the railway truck of the vehicle, the spacing between the left outer surface of the first restraining member and the left-side restraining wall surface of the second restraining member and the spacing between the right outer surface of the first restraining member and the right-side restraining wall surface of the second restraining member are equal to each other (claim 1).

According to this invention, a pair of air springs individually provided at the left side and right side of the railway truck can be structured so as to have the same spring property even at the time of the curved-track running.

As an aspect of the present invention, the present invention offers an air spring for a vehicle, the air spring being to be used in a vehicle having a railway truck and a vehicle body, being to be mounted between the railway truck and the vehicle body, and having:
 a diaphragm placed between an upper board to be connected to the vehicle body and a lower board, and
 a stopper rubber placed between a lower plate to be connected to the railway truck and the lower board.
The air spring further has a displacement-restraining mechanism that has:
 a first restraining member placed on either one of the lower plate and the lower board, and
 a second restraining member placed on the other.
In a state where the vehicle provided with the air spring is running along a straight track, when the traveling direction of the vehicle is defined as the back-and-forth direction and the direction perpendicular to the back-and-forth direction in a horizontal plane is defined as the left-right direction:
 the first restraining member has left and right outer surfaces positioned in the left and right directions, respectively, away from the center of a horizontal cross section of the first restraining member,
 the second restraining member has restraining wall surfaces located at the left side and right side of the first restraining member and facing the left and right outer surfaces of the first restraining member, respectively, and
 the shape of the restraining wall surfaces is formed such that in the relative positional relationship between the first restraining member and the second restraining member, when the first or second restraining member displaces itself such that it delineates an arc by placing the center at the railway truck axis of the railway truck of the vehicle, as the amount of displacement along the arc increases, the spacing between the left outer surface of the first restraining member and the left-side restraining wall surface of the second restraining member and the spacing between the right outer surface of the first restraining member and the right-side restraining wall surface of the second restraining member decrease (claim 2).

In the displacement (wobbling) in the left-right direction of the railway truck and vehicle body, when the spacing between the restraining members is narrower, the stopper rubber is restrained at a smaller displacement in comparison with the case of a wider spacing, thereby rendering the air spring stiff as a whole. The air spring of the present invention is structured in such a way that, when the first or second restraining member displaces itself such that it delineates an arc by placing the center at the railway truck axis of the railway truck of the vehicle, that is, when the vehicle runs along a curved track, as the amount of displacement along the arc increases, the spacing between the left outer surface of the first restraining member and the left-side restraining wall surface of the second restraining member and the spacing between the right outer surface of the first restraining member and the right-side restraining wall surface of the second restraining member decrease. Consequently, an increase in the curvature of a curved track tends to increase the spring constant, thereby improving the comfortableness in the vehicle even at a high-speed running.

It is desirable that the shape of the restraining wall surfaces is formed such that as the amount of displacement along the arc increases, the spacing between the left outer surface of the first restraining member and the left-side restraining wall surface of the second restraining member and the spacing between the right outer surface of the first restraining member and the right-side restraining wall surface of the second restraining member decrease while maintaining their magnitudes equal to each other (claim 3).

When the spacings at the left side and right side are equal to each other, a pair of air springs individually provided at the left side and right side of the vehicle can be structured so as to have the same spring property even at the time of the curved-track running.

It is desirable that the first restraining member be a member having a solid-cylindrical outer surface (claim 4). The reason for this is that the first restraining member is easily formed concentrically with the center axis of the air spring and consequently has flexibility in design, the member has high strength, and the production cost can be suppressed.

In addition, it is desirable that the second restraining member be formed with two independent portions at the left and right. More specifically, it is desirable that the two portions be fixed such that one portion is positioned at either one of the left side and the right side of the first restraining member and the other portion is positioned at the other side. The wall surfaces can be designed and produced individually, so that the design can have flexibility and the production cost can be suppressed.

It is desirable that the restraining wall surfaces of the second restraining member be each a curved surface forming an arc whose center is located at the railway truck axis, which is the rotation axis of the railway truck, in a horizontal cross section of the second restraining member (claim 5). When this structure is employed, the first restraining member and the restraining wall surfaces of the second restraining member perform a relative displacement on the arc whose center is located at the railway truck axis, so that the spacings can be maintained constant.

Although the second restraining member is provided to suppress the displacement of the stopper rubber in the left-right direction, the second restraining member is not necessarily required to suppress the displacement in the back-and-forth direction. That is, a structure may be employed in which the air spring has no mechanism, composed of wall surfaces or the like, for restraining a displacement in the back-and-forth direction of the first restraining member (claim 6). The structure that allows free movement in the back-and-forth direction can further exploit the flexible property for backward-and-forward wobbling. Consequently, not only can the comfortableness in the vehicle be improved but also the increase in the side pressure to the wheels at the time of the curved-track running can be suppressed to enable the contribution to the improvement in safety.

Furthermore, the present invention offers a railway truck for a vehicle, the railway truck having a plurality of air springs for a vehicle as described above (claim 7). The use of the air spring of the present invention as a secondary spring of a railway truck can achieve stable and good vibration-restraining property even at the time of the curved-track running, thereby enabling the obtaining of a vehicle having improved comfortableness. More specifically, the railway truck for a vehicle is a railway truck provided with four wheels through two axles and is provided with two air springs each placed at a position between the axles in the back-and-forth direction of the railway truck, with the two air springs being located at the left-right symmetrical positions with respect to the rotation axis of the railway truck. In the case where the railway truck is a bolsterless railway truck, the air spring of the present invention can be more desirably applied.

An explanation is given below on how the present invention works. First, by explaining the behavior of the railway vehicle, a problem that arises in the air spring is explained. FIG. 2(a) schematically shows the structure of the typical railway vehicle when viewed from above. The vehicle is composed of a vehicle body 101 and two railway trucks 111 and 112 mounted underneath the vehicle body. The railway truck is provided with four wheels on two axles (not shown) and runs on the track. In FIG. 2(a), the track center line is denoted by a sign 120. The vehicle body 101 is connected to the railway trucks 111 and 112 through two air springs 131 and 132 at the left and two air springs 133 and 134 at the right, respectively, and the individual railway truck is fixed to the vehicle body so as to be able to rotation-displace itself horizontally with the center being located at the railway truck axis. This rotation displacement allows each of the two railway trucks to change its angle with the vehicle body even in the case where the track is curved. As a result, the wheels can move following the track. FIG. 2 shows the state in which the track center line 120 is curved at a certain curvature, and an angle θ that the railway truck forms with the vehicle body is referred to as a bogie angle.

FIG. 2(b) shows a diagram for explaining the rotation of the railway truck and the state of displacement of the air spring in the railway truck 112 shown in FIG. 2(a). The original position of the railway truck and its rotation-displaced position at a curved track are shown by rectangles 112a and 112b, respectively. It is understood that in the air spring shown in FIG. 1, the upper board is fixed to the vehicle body and the lower plate is fixed to the railway truck to absorb the vibration and displacement between the vehicle body and the railway truck. Consequently, when the railway truck and the vehicle body displace themselves relative to each other as in the case of the curved-track running, the upper board and the lower plate horizontally displace themselves relative to each other. The foregoing displacement is expressed as the bogie angle θ with the center being located at the railway truck axis. In FIG. 2(b), the signs 133 and 134 show the original positions of the air springs, that is, the positions of the upper boards fixed to the vehicle body, and signs 133a and 134a show the positions of the air springs of the displaced railway truck, that is, the positions of the lower plates. As described above, the upper board and the lower plate displace themselves at the bogie angle θ with the center being located at the railway truck axis.

FIG. 3 is a diagram for schematically explaining the relationship between the hollow-cylindrical protruding member 14 fixed to the lower plate and both side walls (straight side walls) 13b and 13c of the cross-sectionally long hole 13a fixed to the lower board in the state where the displacement takes place as shown in FIG. 2. As described above, the upper board and the lower plate displace themselves by the bogie angle θ. In this case, the lower board supported both by the diaphragm and by the stopper rubber at an intermediate position between the two members displaces itself to an intermediate position between the two members. As shown in FIG. 3, it displaces itself by an angle α, which is smaller than the bogie angle θ. In FIG. 3, dotted lines show the two side walls and the protruding member 14a all at the neutral position at the time of the straight-track running. In other words, the stopper rubber does not deform itself at all and is located at the position in the case where the lower board and the lower plate remain at the original position. Consequently, the spacing between the side wall and the protruding member is L1, which is the same both at the right side and at the left side of the protruding member. When the vehicle wobbles leftward and rightward, the upper board and the lower board of the air spring wobble leftward and rightward through the diaphragm and the lower board and the lower plate wobble similarly through the stopper rubber to absorb the vibration. Under this condition, when the magnitude of wobbling is increased and then the deformation of the stopper rubber reaches L1, the protruding member is brought into contact with the side wall and consequently the displacement at the stopper-rubber side is terminated, enabling only the diaphragm to function. At this moment, because a pair of air springs A and B provided at the right side and the left side of the vehicle, respectively, are provided symmetrically with respect to the rotation axis of the railway truck, they move in the opposite directions with respect to each other when the vehicle body and the railway truck wobble leftward and rightward relative to each other. More specifically, in FIG. 3, when the railway truck moves to the left direction relatively, in the air spring A, the protruding member approaches the side wall 13c and in the air spring B, the protruding member approaches the side wall 13b. Because the spacing between the protruding member and the side wall is the same L1 at the left side and right side, ideally, the protruding members at the left side and right side function simultaneously.

Nevertheless, at the time of the curved-track running, as shown in FIG. 3, the protruding member 14b is at the position in a state where it displaces itself by the bogie angle θ together with the lower plate, and the side walls 13b and 13c are at the positions in a state where they displace themselves by the angle α together with the lower board. In this state, because the protruding member displaces itself by the angle θ-α with respect to the side wall with the center being located at the railway truck axis, the spacing with the side wall is changed. More specifically, in both the air spring A and the air spring B, the spacing between the protruding member and the side wall positioned at the outer side of the vehicle with respect to the protruding member is increased to L3, and conversely, the spacing between the protruding member and the side wall positioned at the inner side of the vehicle is decreased to L2. Under this condition, when the vehicle wobbles with respect to the railway truck as described above, in the air spring A, the protruding member moves toward the spacing having the small value of L2 and in the air spring B, it moves toward the spacing having the large value of L3. Consequently, the displacement of the stopper rubber of the air spring A is restrained first, and under this condition, the air spring B is not restrained yet. As a result, an imbalance is created between the spring constants of the air springs at the left and right. This imbalance leads to the impairing of the comfortableness in the running vehicle.

Advantageous Effects of Invention

As described above, by using the air spring of the present invention on a vehicle or by using a railway truck incorporating the air spring of the present invention, a stable vibration-restraining function can be exercised, so that the comfortableness in the vehicle can be improved.

BRIEF DESCRIPTION OF DRAWINGS

FIG. 1 is a cross-sectional view showing an example of the air spring of the prior art.

FIG. 2 schematically illustrates an air spring mounted on a railway vehicle and the displacement at the time of the curved-track running, in which (a) shows a diagram for explaining the positions of the vehicle body and the railway trucks when the vehicle is viewed from above and (b) shows a diagram for explaining the displacement of the railway truck and the air spring.

FIG. 10 is a diagram showing an example of the railway truck of the present invention for a vehicle, in which (a) shows a diagram viewed from above and (b) shows a diagram viewed from a side.

DESCRIPTION OF EMBODIMENTS

Figure 3:
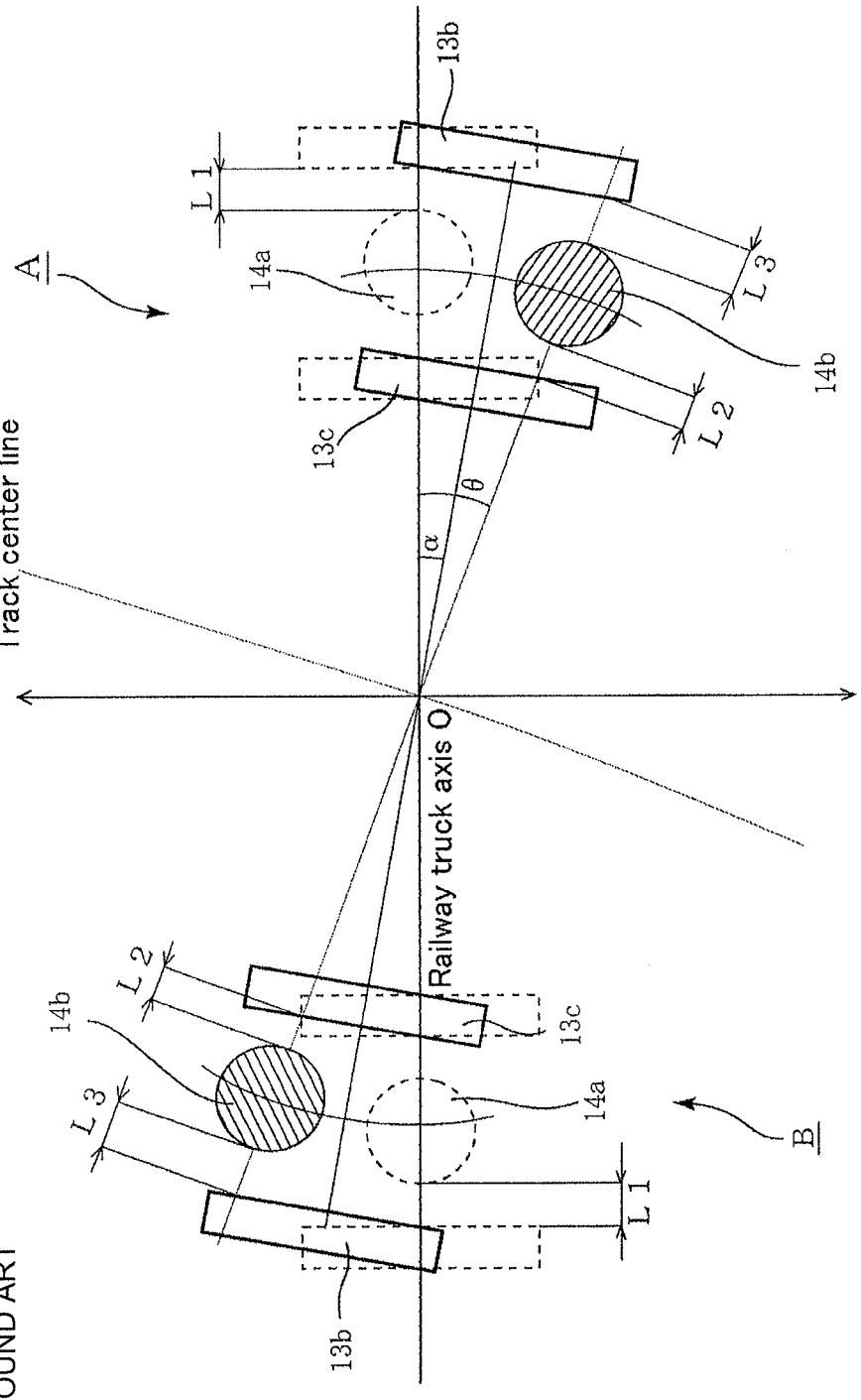
FIG. 3 is a diagram for explaining a state of the displacement of a restraining member in an air spring of the prior art.

A detailed explanation is given below to the structure and function of the air spring of the present invention referring to the drawing. In the explanation below, when the relative positional change between the railway truck and the vehicle body is shown, only the plane geometrical relationship in position resulting from the straight-track running and the curved-track running of the vehicle is shown to explain how the present invention works and exhibits its effects. Accordingly, the present invention does not preclude the performing of a design by additionally considering the fact that the influence caused by the actual relative positional variations added by other factors (such as centrifugal force and other side-to-side wobbling) acts as an error factor that creates deviations from the ideal relative position.

Figure 4:
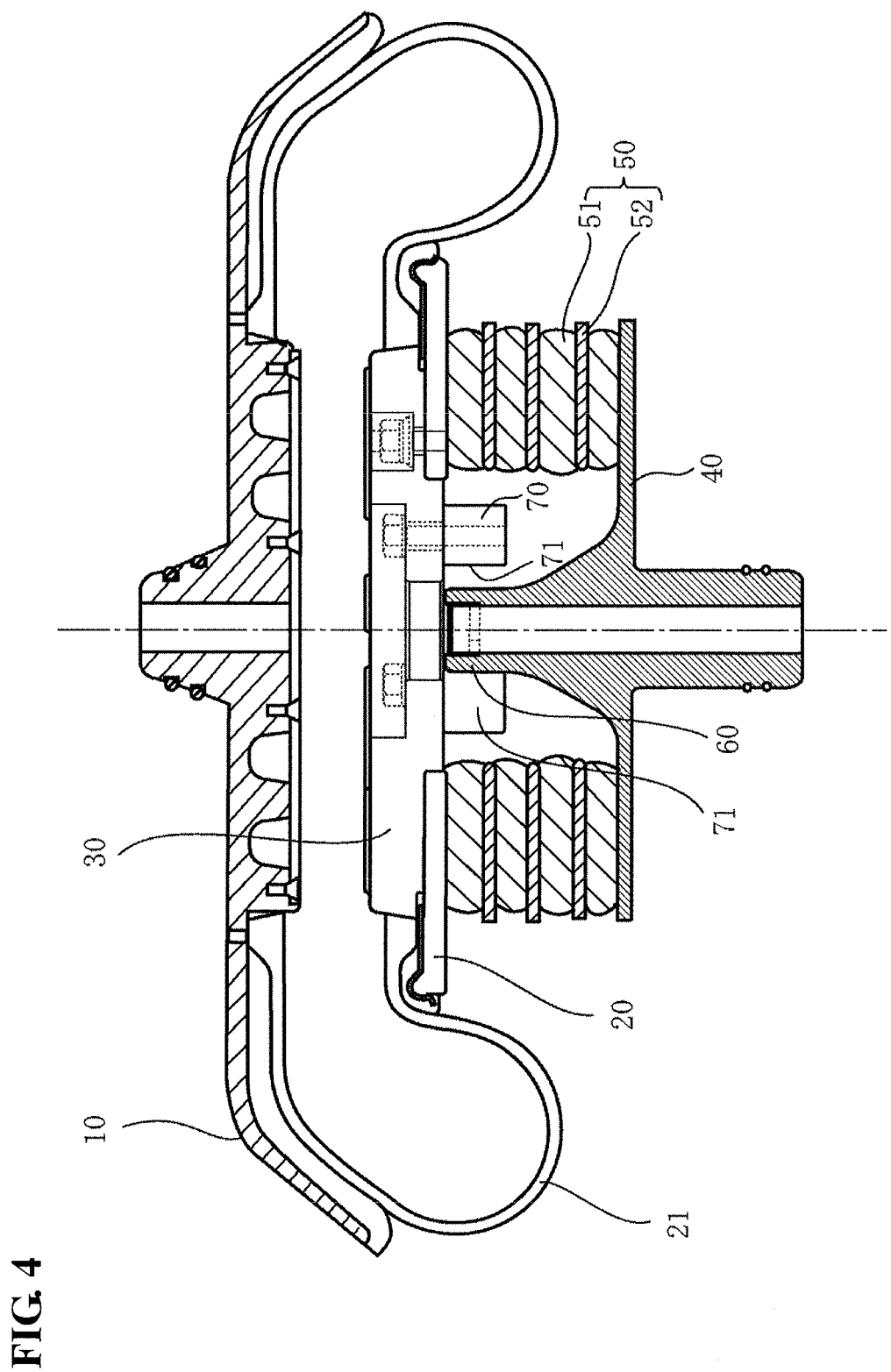
FIG. 4 is a cross-sectional view showing an example of the air spring of the present invention.

FIG. 4 is a cross-sectional view showing an example of the air spring provided with the structure of the present invention. The right-side half from the center of the diagram shows the cross section in the left-right direction when an air spring, whose entire shape is nearly circular when viewed from above and below, is mounted on a railway truck of a vehicle. The left-side half from the center of the diagram shows the cross section in the back-and-forth direction. A diaphragm 21 has a structure in which it is attached hermetically to an upper board 10, which has the shape of an umbrella and has at its center a connecting axis provided with an air-introducing hole, and to a lower board 30, so that the diaphragm is inflated by applying an air pressure to its inside. A stopper rubber 50 is attached beneath the lower board 30. The stopper rubber is formed using a single or multiple rubber layers. In this example, it has a structure in which a rubber layer 51 and a plate 52 are stacked on top of each other in layers and the stacked layers are sandwiched between an upper plate 20 and a lower plate 40 to be fixed. The lower plate 40 and the lower board 30 are each provided with an air-introducing hole to enable air pressurization to the diaphragm. These air-introducing holes can have various structures. In an air spring used in a typical railway vehicle, the upper board has a diameter of about 0.5 m to about 1.5 m and the lower plate has a diameter of about 0.2 m to about 0.7 m.

Although not shown in this example, a design may be employed in which arc-shaped (when viewed from above) covers that concentrically cover the diaphragm are attached to the upper board at 180-degree opposite positions. In this case, when the horizontal displacement of the air spring reaches a predetermined amount, the diaphragm is designed to be brought into contact with the covers to increase the air reaction force of the diaphragm. When this design is employed, the amount of horizontal displacement can be decreased without being accompanied by an impact.

In this example, a side-wall member 70, which forms the second restraining member placed underneath the lower board, is composed of two independent components, which are bolt-fixed at the 180-degree opposite positions with respect to the center axis of the air spring. A protruding member 60, which forms the first restraining member, is formed as a single-piece structure with the lower plate and has the shape of a hollow cylinder concentric with the center axis of the air spring. When the outer peripheral surface of the protruding member 60 is brought into contact with a side wall 71 of the side-wall member 70, the displacement caused by the deformation of the stopper rubber 50 can be limited. Although FIG. 4 shows a structure in which the side-wall member is provided underneath the lower board and the protruding member is provided at the lower plate, an inverse structure may be employed in which the protruding member is provided underneath the lower board and the side-wall member is provided at the lower plate. Furthermore, although in FIG. 4, the side-wall member is attached to the lower board as the separate member, it may be formed as a unified portion in the lower board. The structure is not limited to a structure in which the side-wall member protrudes downward from the lower board; a structure may be employed in which a similar wall member is provided in the lower board. Similarly, although FIG. 4 shows an example in which the protruding member is formed as a unified part in the lower plate, it may be combined with the lower plate as a separate component. In any case, these concrete structures can be designed as appropriate considering the easiness in design and production and the cost of material and production provided that they have the feature of the restraining member of the present invention. This example specifies that the protruding member's portion facing the side-wall member has an outer diameter of 30 to 70 mm and that in the side-wall member, the spacing between the left and right side walls is 34 to 120 mm.

Figure 5:
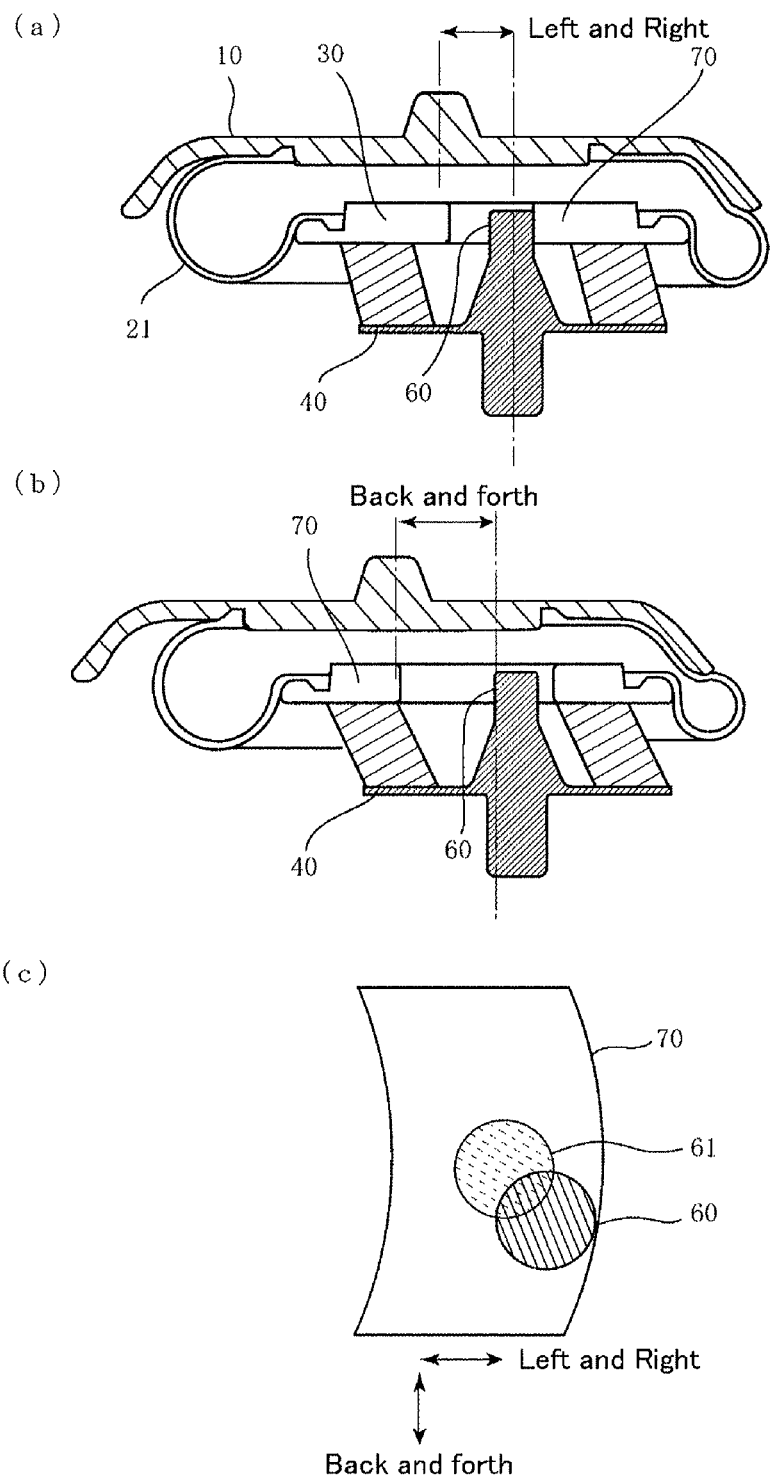
FIG. 5 schematically illustrates the function of the restraining member of the air spring of the present invention, in which (a) shows a diagram for explaining the leftward-and-rightward movement, (b) shows a diagram for explaining the backward-and-forward movement, and (c) shows a diagram for explaining the relationship between the protruding member and the side wall.

Referring to FIG. 5, an explanation is given to the function of the side-wall member, which forms the second restraining member, and the protruding member, which forms the first restraining member. For the simplicity of the explanation of the function, FIG. 5 shows a structure in which the side-wall member 70 is unitarily formed together with the lower board 30 as a part of it with the shape of a groove and the protruding member 60 is unitarily formed together with the lower plate 40 as a solid-cylindrical protruding body. In addition, the stopper rubber is shown as a single layer with other detailed structures being omitted. In the original position where no external force is applied to the air spring, as shown in FIG. 4, the upper board 10, the lower board 30, and the lower plate 40 are concentrically placed from top to bottom. FIG. 5(a) shows a cross section of the air spring when it is bisected in the left-right direction, and FIG. 5(b) shows a cross section when it is bisected in the back-and-forth direction. When the air spring is mounted on a vehicle, in a state of the straight-track running, the traveling direction of the vehicle is defined as the back-and-forth direction and the direction perpendicular to the back-and-forth direction is the widthwise direction of the vehicle and is defined as the left-right direction. FIG. 5(c) shows an enlarged schematic diagram of the portion composed of the protruding member 60 and the side-wall member 70 when viewed from above. The diagram shows a state in which the protruding member 60 undergoes a relative displacement in a hole provided in the lower board acting as the side-wall member. In FIG. 5(c), a protruding member 61 shows the original position before the protruding member is displaced.

FIGS. 5(a) to 5(c) each show a state in which the upper board 10, which is fixed to the vehicle body (not shown), and the lower plate 40, which is fixed to the railway truck (not shown), are displaced by the relative displacement between the vehicle body and the railway truck. More specifically, the diaphragm 21 and the stopper rubber 50 deform themselves in response to the relative displacement between the upper board 10 and the lower plate 40. FIG. 5(a) shows a state in which the protruding member 60 is brought into contact with the side-wall member 70 and hence no more displacement is possible. Consequently, under this condition, the relative displacement between the vehicle body and the railway truck, that is, between the upper board 10 and the lower plate 40, beyond the foregoing state is absorbed only by the deformation of the diaphragm. On the other hand, in FIG. 5(b), there still exists a margin in the spacing between the protruding member 60 and the side-wall member 70, both of which are not brought into contact with each other. In other words, under this condition, the relative displacement between the vehicle body and the railway truck, that is, between the upper board 10 and the lower plate 40, is absorbed both by the deformation of the diaphragm and by the deformation of the stopper rubber. In this case, the two members absorb the displacement by sharing it at a ratio corresponding to their spring constants. Generally, the sharing ratio of the displacement between the diaphragm and the stopper rubber is designed such that the stopper rubber bears 5% to 50% of the total relative displacement, 60% or so at the most in a usual range. When the spring constant of the diaphragm remains unchanged, the increasing of the displacement-bearing ratio of the stopper rubber is achieved by using a flexible stopper rubber, that is, by decreasing the spring constant. When this is achieved, the comfortableness in the vehicle at the time of the straight-track running tends to be improved as a whole. In contrast, the flexibility is excessively high at the time of the curved-track running, so that the comfortableness in the vehicle is impaired. Consequently, a stiffer characteristic is required in the left-right direction. To meet this requirement, a design is employed in which the deformation of the stopper rubber is restricted by the protruding member when the leftward-and-rightward deformation exceeds a predetermined limit. When this restriction is performed, the stopper rubber is brought into an unlimitedly stiff state (the spring constant is large).

As an example is shown in FIG. 5(c), a desirable feature of the restraining member of the present invention, that is, the protruding member and the side-wall member, is that the restraining mechanism is composed of the curved surface formed by the surface of the protruding member and the curved surfaces formed by the surfaces of the left and right side walls. Because all the surfaces are curved surfaces, a design can be performed in which even at the time of the curved-track running, the spacing between the two surfaces at the left side and the spacing between the two surfaces at the right side are the same. On the other hand, the walls at the front and rear sides to be brought into contact with the protruding member may be eliminated. In other words, unlike the structure shown in FIG. 5, a side-wall member having only the left and right walls without having the front and rear walls can achieve the effect of the present invention. In this case, a more flexible spring property can be secured in the back-and-forth direction, so that good comfortableness in the vehicle can be maintained. A concrete movement is explained by referring to FIG. 6.

Figure 6:
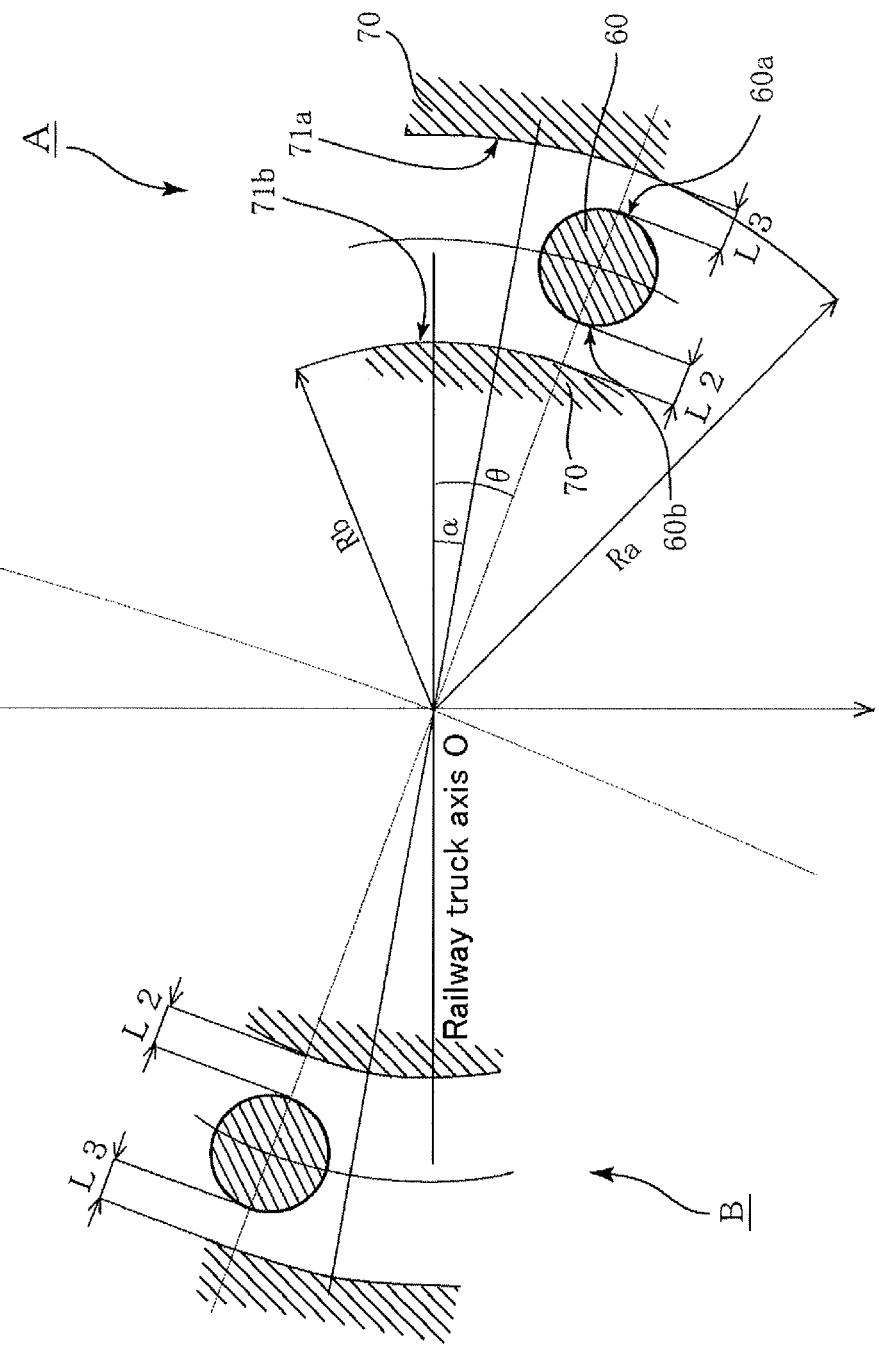
FIG. 6 is a diagram for explaining a state of the displacement of the restraining member in an air spring of the present invention.

As with FIG. 3, FIG. 6 is a diagram for schematically explaining a relative positional relationship in the restraining member of the air spring as an example of the present invention while a vehicle incorporating the air spring is running along a curved track. For the easiness of the comparison with FIG. 3, the same signs are used except for the protruding member 60 and the side-wall member 70. The side-wall member 70 has a side wall 71a, which faces the protruding member at the far side from the center of the railway truck, and a side wall 71b, which faces the protruding member at the near side to the center of the railway truck. The protruding member 60 has a surface 60a at a side that faces the side wall 71a and a surface 60b at a side that faces the side wall 71b. Although this example illustrates the protruding member as a solid-cylindrical member, it may be a member that is divided into a portion having the surface 60a and a portion having the surface 60b.

As described above, in the air spring at the time of the curved-track running, although the upper board and the lower plate displace themselves by the bogie angle θ, the lower board supported both by the diaphragm and by the stopper rubber at an intermediate position between the two members displaces itself to an intermediate position between the two members. As shown in FIG. 6, it displaces itself by an angle α, which is smaller than the bogie angle θ. As with the case in FIG. 3, at the neutral position at the time of the straight-track running, the spacings between the surface of the protruding member and the surfaces of both side walls are denoted as L1 (not shown). When the vehicle wobbles leftward and rightward, the upper board and the lower board of the air spring wobble leftward and rightward through the diaphragm and the lower board and the lower plate wobble similarly through the stopper rubber to absorb the vibration. Under this condition, when the magnitude of wobbling is increased and then the deformation of the stopper rubber reaches L1, the protruding member is brought into contact with the side wall and consequently the displacement at the stopper-rubber side is terminated, enabling only the diaphragm to function. At this moment, because a pair of air springs A and B provided at the right side and the left side of the vehicle, respectively, are provided symmetrically with respect to the rotation axis of the railway truck, they move in the opposite directions with respect to each other when the vehicle body and the railway truck wobble leftward and rightward relative to each other.

More specifically, in FIG. 6, when the railway truck moves to the left direction relatively, in the air spring A, the protruding member approaches the side wall 71b and in the air spring B, the protruding member approaches the side wall 71a. Because the spacing between the protruding member and the side wall is the same L1 at the left side and right side, the protruding members at the left side and the right side function simultaneously.

At the time of the curved-track running, as shown in FIG. 6, the protruding member 60 and the side-wall member 70 perform a relative displacement by the angle θ−α a with the center being located at the railway truck axis O. Under this condition, in the structure of the restraining member of the air spring of the present invention, the shape of the side wall is designed such that the spacing L3 between the protruding member's surface 60a and the side wall 71a is the same as the spacing L2 between the protruding member's surface 60b and the side wall 71b. In this example, the side wall 71a and the side wall 71b are formed with arc shapes having a radius Ra and a radius Rb, respectively, with the center being located at the railway truck axis O of the railway truck provided with the air springs. Consequently, with respect to the protruding member 60, which displaces itself in the same manner as above on an arc whose center is located at the railway truck axis, the side-wall member 70 can maintain the same spacing without regard to the amount of angular displacement caused by the bogie angle. In other words, the spacings L2 and L3 are equal to each other and are constant without regard to the amount of displacement of the protruding member 60 with the center being located at the railway truck axis. As a result, the pair of air springs A and B individually mounted at the right side and left side of the vehicle operate as follows: when the vehicle moves leftward relatively in FIG. 6, in the air spring A, the protruding member's surface 60b approaches the side wall 71b and in the air spring B, the protruding member's surface 60a approaches the side wall 71a. Because the spacings L2 and L3 are equal to each other, the protruding members at the right side and left side function simultaneously, enabling the air spring A at the right side and the air spring B at the left side to exercise the same spring property. In consideration of the railway truck used in a typical railway vehicle, the spacing for mounting the right and left air springs is 1.5 to 3.5 m and the distance from the railway truck axis to the center of the protruding member is 0.75 to 1.75 m. It is desirable that the spacing between the protruding member and the side wall be 2 to 25 mm. Consequently, when the protruding member has an outer-surface diameter of 30 to 70 mm, the radius Ra of the arc of the side wall is 767 to 1,810 mm and the radius Rb is 690 to 1,734 mm.

As shown in the above example, when the side walls have concentric arc shapes, the design and production are easy in terms of obtaining constant spacings. The air spring of the present invention, however, has no limitation on the shape providing that the structure achieves that the left side and the right side have the same spacing when the protruding member 60 performs an arc-shaped displacement. For example, by designing the side wall 71a having the shape of an arc with a curvature larger than that of the above-described concentric side wall and the side wall 71b having the shape of an arc with a curvature smaller than that of the above-described concentric side wall, the condition L2=L3 can be achieved even while the spacings L2 and L3 are gradually varying. Of course, the shape of the side wall is not limited to an arc having a constant curvature; the side wall may have a curved surface whose curvature varies. The side-wall member may also be formed with a shape creating spacings that are not strictly equal to each other, for example, with a combination of straight lines for obtaining a shape closely analogous to an arc. Accordingly, it is to be considered that a shape falls within the scope of the present invention providing that the shape more uniformly improves the left and right spacings at the time of the curved-track running in comparison with the case where the side walls are formed with straight lines as shown in the explanation of the operation by referring to FIG. 3.

Figure 7:
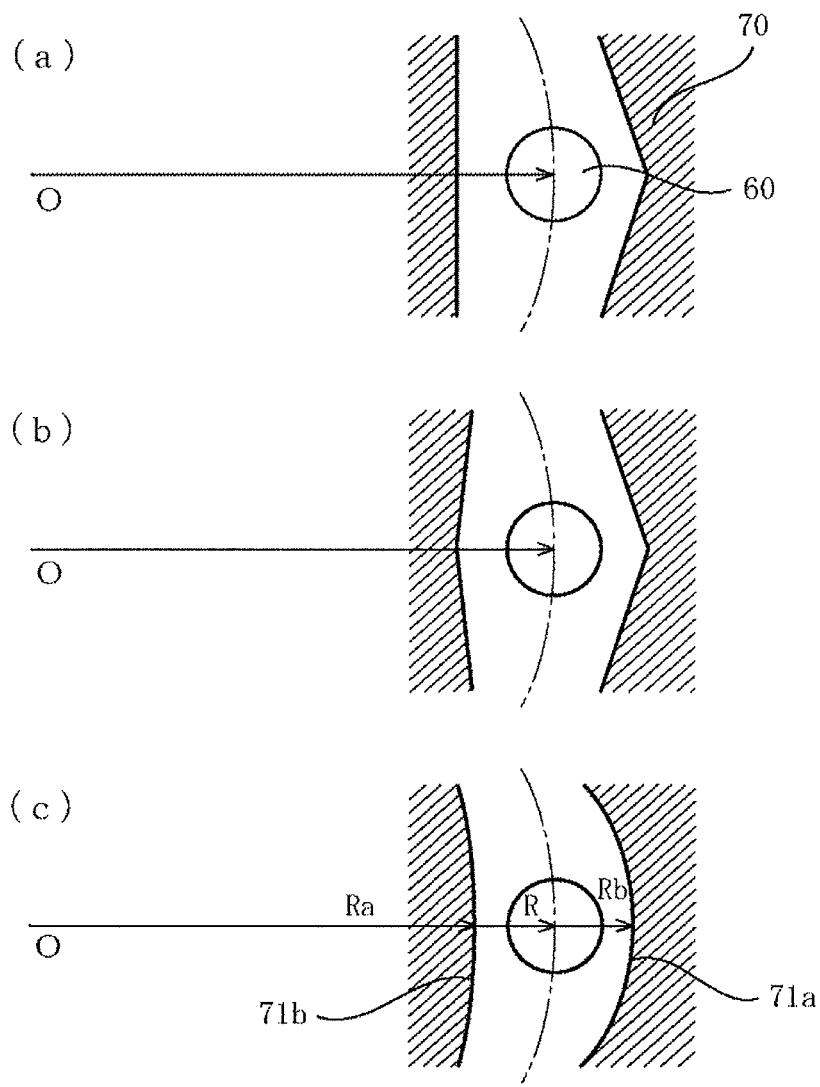
FIG. 7 is a diagram schematically showing examples of the structure of the restraining member in an aspect of the present invention.

Next, as an aspect of the present invention, the restraining member, that is, the protruding member and the side-wall member, has a feature in that the restraining member is formed such that the spacing between the protruding member and the side-wall member decreases as the displacement with the center being located at the railway truck axis increases. An explanation is given by showing examples of the structure in FIG. 7. FIG. 7 schematically shows horizontal cross sections of a protruding member 60 and a side-wall member 70. FIG. 7 shows examples of the structure in which when the protruding member 60 displaces itself such that it delineates an arc by placing the center at the railway truck axis O, the left and right spacings with the side-wall member 70 decrease. FIG. 7(a) shows that the side wall located at the inner side is formed by a straight line and the side wall located at the outer side is formed by a crooked line, FIG. 7(b) shows that both side walls are each formed by a crooked line, and FIG. 7(c) shows that both side walls are each formed by a curved line. Although any of the foregoing shapes can achieve the effect of the present invention, it is desirable to employ the curved line shown in FIG. 7(c) in terms of obtaining a smooth property shift in response to the amount of displacement. A particularly desirable structure is shown below. In FIG. 7(c), in the left-right direction, the distance from the railway truck axis at the neutral position to the inner side wall is denoted as Ra, the distance to the center of the protruding member is denoted as R, and the distance to the outer side wall is denoted as Rb. In this case, when the radius of curvature of the inner side wall 71b is larger than Ra, the radius of curvature of the outer side wall 71a is smaller than Rb, and the side walls 71a and 71b are formed by curved lines such that at the time the protruding member displaces itself along an arc having a radius of R, the spacings between the surface of the protruding member and the surfaces of the side walls 71a and 71b become the same, not only can the effect of the present invention be achieved but also a vibration-restraining performance can be obtained that has a smooth property shift and that is equal for leftward and rightward vibrations.

Figure 8:
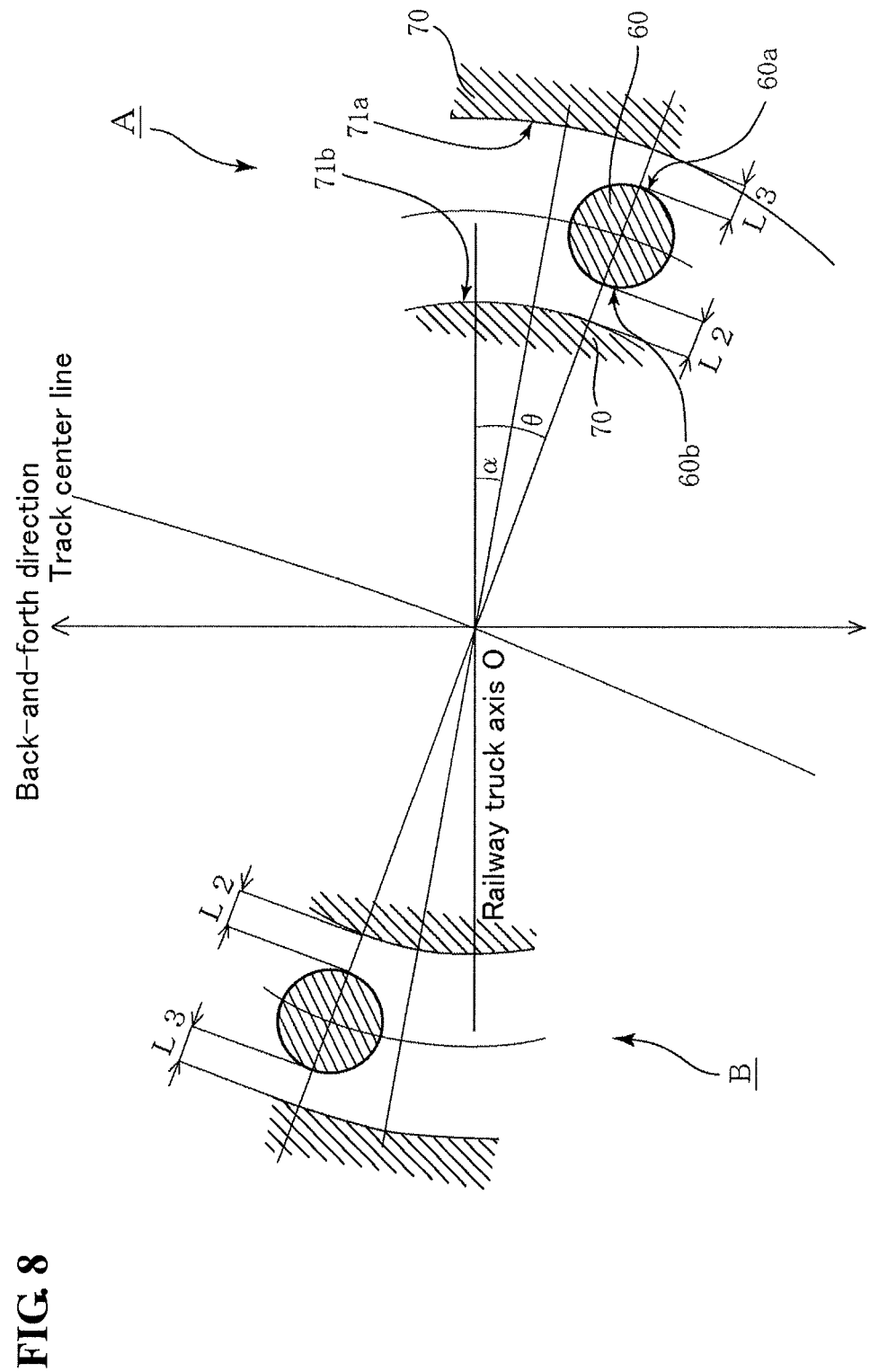
FIG. 8 is a diagram for explaining a state of the displacement of the restraining member of the air spring in an aspect of the present invention.

As with FIG. 3, FIG. 8 is a diagram for schematically explaining a relative positional relationship in the restraining member of the air spring as the example of an aspect of the present invention while a vehicle incorporating the air spring is running along a curved track. For the easiness of the comparison with FIG. 3, the same signs are used except for the protruding member 60 and the side-wall member 70. The side-wall member 70 has a side wall 71a, which faces the protruding member at the far side from the railway truck axis, and a side wall 71b, which faces the protruding member at the near side to the center of the railway truck. The protruding member 60 has a surface 60a at a side that faces the side wall 71a and a surface 60b at a side that faces the side wall 71b. Although this example illustrates the protruding member as a solid-cylindrical member, it may be a member that is divided into a portion having the surface 60a and a portion having the surface 60b.

As described above, in the air spring at the time of the curved-track running, although the upper board and the lower plate displace themselves by the bogie angle θ, the lower board supported both by the diaphragm and by the stopper rubber at an intermediate position between the two members displaces itself to an intermediate position between the two members. As shown in FIG. 8, it displaces itself by an angle α, which is smaller than the bogie angle θ. As with the case in FIG. 3, at the neutral position at the time of the straight-track running, the spacings between the surface of the protruding member and the surfaces of both side walls are denoted as L1 (not shown). When the vehicle wobbles leftward and rightward, the upper board and the lower board of the air spring wobble leftward and rightward through the diaphragm and the lower board and the lower plate wobble similarly through the stopper rubber to absorb the vibration. Under this condition, when the magnitude of wobbling is increased and then the deformation of the stopper rubber reaches L1, the protruding member is brought into contact with the side wall and consequently the displacement at the stopper-rubber side is terminated, enabling only the diaphragm to function. At this moment, because a pair of air springs A and B provided at the right side and the left side of the vehicle, respectively, are provided symmetrically with respect to the rotation axis of the railway truck, they move in the opposite directions with respect to each other when the vehicle body and the railway truck wobble leftward and rightward relative to each other. More specifically, in FIG. 8, when the railway truck moves to the left direction relatively, in the air spring A, the protruding member approaches the side wall 71b and in the air spring B, the protruding member approaches the side wall 71a. Because the spacing between the protruding member and the side wall is the same L1 at the left side and right side, the protruding members at the left side and the right side function simultaneously.

At the time of the curved-track running, as shown in FIG. 8, the protruding member 60 and the side-wall member 70 perform a relative displacement by the angle θ-α with the center being located at the railway truck axis O. Under this condition, in the structure of the restraining member of the air spring of the present invention, the side wall 71a is formed such that the spacing L3 between the protruding member's surface 60a and the side wall 71a decreases as the amount of relative displacement θ-α increases. Similarly, the side wall 71b is formed such that the spacing L2 between the protruding member's surface 60b and the side wall 71b also decreases as the amount of relative displacement θ-α increases. According to this structure, as the vehicle runs along a curved track having a larger curvature, the spacings become narrower, so that the deformation of the stopper rubber can be restrained more quickly and hence the stiffness of the entire air spring can be increased. As a result, the comfortableness in the vehicle can be improved at the time of the curved-track running.

Figure 9:
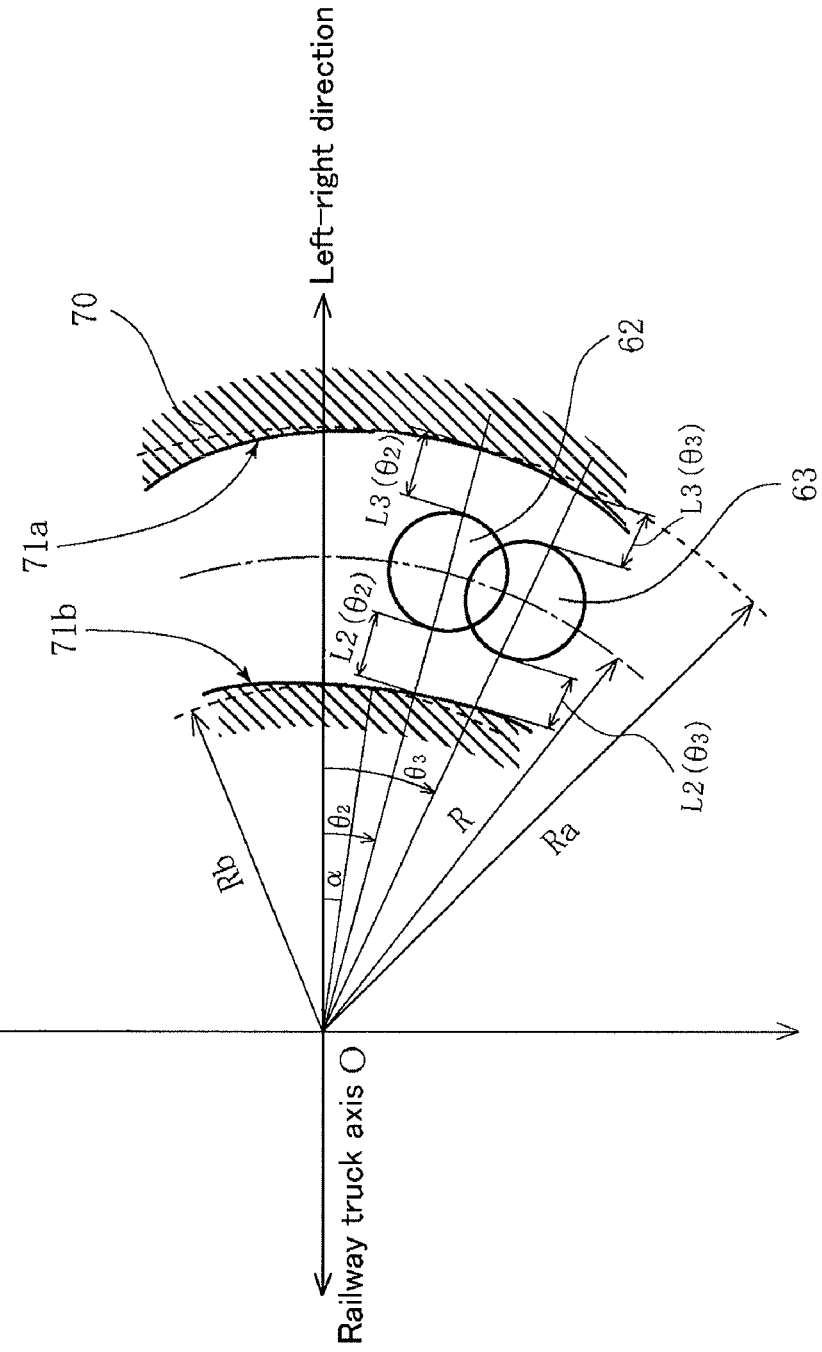
FIG. 9 is a diagram for explaining in more detail a state of the displacement of the restraining member in the air spring in an aspect of the present invention.

The foregoing state is explained in more detail by referring to FIG. 9. FIG. 9 is a diagram showing in one diagram both a state in which the protruding member displaces itself by θ2 and a state in which the protruding member displaces itself by θ3 both under the condition that the side-wall member 70 displaces itself by an angle α from the left-right direction. Actually, the displacement angle α of the side-wall member varies slightly in response to the displacements of θ2 and θ3. Nevertheless, for the easiness of the explanation in light of the difference in the relative displacement, the explanation is given by assuming that α remains the same.

The side walls are formed such that the protruding member 62, which has displaced itself by θ2, has spacings of L3 (θ2) and L2 (θ2) with the right and left side walls 71a and 71b, respectively, the protruding member 63, which has displaced itself by θ3, has spacings of L3 (θ3) and L2 (θ3) with the right and left side walls 71a and 71b, respectively, and L3 (θ2) is equal to L2 (θ2), L3 (θ3) is equal to L2 (θ3), and L3 (θ2) is larger than L3 (θ3). More specifically, the side wall 71a is formed of a curved line having a larger curvature than a curved line having a radius of Ra with the center being located at the railway truck axis O, and the side wall 71b is formed of a curved line having a smaller curvature than a curved line having a radius of Rb with the center being located at the railway truck axis O. This design attains the objective of gradually narrowing the left and right spacings, with the left and right spacings being maintained equal to each other. Because the left and right spacings are equal to each other, the restraining members of the two air springs provided symmetrically with respect to the railway truck axis function simultaneously, enabling the air spring A at the right side and the air spring B at the left side to exercise the same spring property. In consideration of the railway truck used in a typical railway vehicle, the spacing for mounting the right and left air springs is 1.5 to 3.5 m and the distance from the railway truck axis to the center of the protruding member is 0.75 to 1.75 m. It is desirable that the spacing between the protruding member and the side wall be 2 to 25 mm.

Railway Truck for Vehicle

The air spring of the present invention is particularly suitable to be used in a 2-axle, 4-wheel railway truck, which is widely used in a railway vehicle. FIG. 10 schematically shows a diagram for a typical structure of the railway truck. Two air springs 130 are each provided at left and right intermediate positions of a railway truck frame 110, to which wheels 140 with the 2-axle, 4-wheel structure are installed, and are each located at the positions symmetric with respect to the railway truck axis 150. The air spring is an air spring having a structure of the present invention, and the structure illustrated in FIG. 4 is shown as an example. As described above, by using the air spring of the present invention and by placing a vehicle body on the railway trucks, the function of the present invention can be exploited as explained before. As a result, the railway vehicle formed with a vehicle body and a railway truck having the foregoing structure can achieve more improved comfort-ableness in the vehicle.

It is to be considered that the above-disclosed embodiments and examples are illustrative and not restrictive in all respects. The scope of the present invention is shown by the scope of the appended claims, not by the above-described explanations. Accordingly, the present invention is intended to cover all revisions and modifications included within the meaning and scope equivalent to the scope of the claims.

REFERENCE SIGNS LIST 5 and 10: upper board
7 and 30: lower board
6 and 21: diaphragm
4 and 20: upper plate
3 and 40: lower plate
2 and 51: rubber layer
1 and 50: stopper rubber
14, 60, 61, 62, and 63: protruding member
13: stopper flange
13a: cross-sectionally long hole
52: plate
70: side-wall member
13b, 13c, 71, 71a, and 71b: side wall
60b and 60a: protruding member's surface
L1, L2, and L3: spacing
101: vehicle body
110: railway truck frame
111 and 112: railway truck 120: track center line
130, 131, 132, 133, 134, A, and B: air spring
140: wheel
150: railway truck axis

The invention claimed is:

1. An air spring for a vehicle, the air spring being to be used in a vehicle comprising a rail-way truck and a vehicle body, being to be mounted between the railway truck and the vehicle body, and comprising:
a diaphragm placed between an upper board to be connected to the vehicle body and a lower board; and
a stopper rubber placed between a lower plate to be connected to the railway truck and the lower board;
the air spring further comprising a displacement-restraining mechanism that comprises:
a first restraining member placed on either one of the lower plate and the lower board; and
a second restraining member placed on the other;
wherein in a state where the vehicle provided with the air spring is running along a straight track, when the traveling direction of the vehicle is defined as the back-and-forth direction and the direction perpendicular to the back-and-forth direction in a horizontal plane is defined as the left-right direction:
the first restraining member has left and right outer surfaces positioned in the left and right directions, respectively, away from the center of a horizontal cross section of the first restraining member;
the second restraining member has restraining wall surfaces located at the left side and right side of the first restraining member and facing the left and right outer surfaces of the first restraining member, respectively; and
the shape of the restraining wall surfaces is formed such that in the relative positional relationship between the first restraining member and the second restraining member, when the first or second restraining member is displaced along a displacement trajectory that delineates an arc around a center of the railway truck axis of the railway truck of the vehicle, the spacing between the left outer surface of the first restraining member and the left-side restraining wall surface of the second restraining member and the spacing between the right outer surface of the first restraining member and the right-side restraining wall surface of the second restraining member are equal to each other.

2. The air spring for a vehicle as defined by claim 1, wherein the first restraining member is a member having a solid-cylindrical outer surface.

3. The air spring for a vehicle as defined by claim 1, wherein the restraining wall surfaces of the second restraining member are each a curved surface forming an arc whose center is located at the railway truck axis in a horizontal cross section of the second restraining member.

4. The air spring for a vehicle as defined by claim 1, the air spring having no mechanism for restraining a displacement in the back-and-forth direction of the first restraining member.

5. A railway truck for a vehicle, the railway truck comprising a plurality of air springs for a vehicle as defined by claim 1.

6. A railway truck for a vehicle, the railway truck comprising a plurality of air springs for a vehicle as defined by claim 2.

7. An air spring for a vehicle, the air spring being to be used in a vehicle comprising a railway truck and a vehicle body, being to be mounted between the railway truck and the vehicle body, and comprising:
a diaphragm placed between an upper board to be connected to the vehicle body and a lower board; and
a stopper rubber placed between a lower plate to be connected to the railway truck and the lower board;
the air spring further comprising a displacement-restraining mechanism that comprises:
a first restraining member placed on either one of the lower plate and the lower board; and
a second restraining member placed on the other;
wherein in a state where the vehicle provided with the air spring is running along a straight track, when the traveling direction of the vehicle is defined as the back-and-forth direction and the direction perpendicular to the back-and-forth direction in a horizontal plane is defined as the left-right direction:
the first restraining member has left and right outer surfaces positioned in the left and right directions, respectively, away from the center of a horizontal cross section of the first restraining member;
the second restraining member has restraining wall surfaces located at the left side and right side of the first restraining member and facing the left and right outer surfaces of the first restraining member, respectively; and
the shape of the restraining wall surfaces is formed such that in the relative positional relationship between the first restraining member and the second restraining member, when the first or second restraining member is displaced along a displacement trajectory that delineates an arc around a center of the railway truck axis of the railway truck of the vehicle, as the amount of displacement along the arc increases, the spacing between the left outer surface of the first restraining member and the left-side restraining wall surface of the second restraining member and the spacing between the right outer surface of the first re-straining member and the right-side restraining wall surface of the second restraining member decrease.

8. The air spring for a vehicle as defined by claim 7, wherein the shape of the restraining wall surfaces is formed such that as the amount of displacement along the arc increases, the spacing between the left outer surface of the first restraining member and the left-side restraining wall surface of the second restraining member and the spacing between the right outer surface of the first restraining member and the right-side restraining wall surface of the second restraining member decrease while maintaining their magnitudes equal to each other.

9. The air spring for a vehicle as defined by claim 7, wherein the first restraining member is a member having a solid-cylindrical outer surface.

10. The air spring for a vehicle as defined by claim 7, the air spring having no mechanism for restraining a displacement in the back-and-forth direction of the first restraining member.

11. A railway truck for a vehicle, the railway truck comprising a plurality of air springs for a vehicle as defined by claim 7.

12. A railway truck for a vehicle, the railway truck comprising a plurality of air springs for a vehicle as defined by claim 8.

13. A railway truck for a vehicle, the railway truck comprising a plurality of air springs for a vehicle as defined by claim 9.

14. A railway truck for a vehicle, the railway truck comprising a plurality of air springs for a vehicle as defined by claim 3.

15. A railway truck for a vehicle, the railway truck comprising a plurality of air springs for a vehicle as defined by claim 4.

16. A railway truck for a vehicle, the railway truck comprising a plurality of air springs for a vehicle as defined by claim 10.

* * * * *